United States Patent
Saito

(10) Patent No.: US 8,215,026 B2
(45) Date of Patent: Jul. 10, 2012

(54) UNDERWATER FOUNDATION LEVELING DEVICE

(76) Inventor: Kiyoshi Saito, Hokkaido (JP)

(*) Notice: Subject to any disclaimer, the term of this patent is extended or adjusted under 35 U.S.C. 154(b) by 182 days.

(21) Appl. No.: 12/791,991

(22) Filed: Jun. 2, 2010

(65) Prior Publication Data

US 2010/0307017 A1 Dec. 9, 2010

(30) Foreign Application Priority Data

Jun. 3, 2009 (JP) ................................. 2009-133839

(51) Int. Cl.
*E02D 15/10* (2006.01)
*E02D 3/046* (2006.01)

(52) U.S. Cl. ............................. 33/366.11; 52/3; 405/271

(58) Field of Classification Search ............... 33/366.11; 405/271; 52/3, 40, 101; 135/99
See application file for complete search history.

(56) References Cited

U.S. PATENT DOCUMENTS

| | | | | |
|---|---|---|---|---|
| 1,072,339 | A | * | 9/1913 | Liljegran ........................ 47/23.2 |
| 2,284,712 | A | * | 6/1942 | Anderson ....................... 312/101 |
| 5,042,959 | A | * | 8/1991 | Tadatsu ......................... 405/191 |
| 6,539,892 | B1 | * | 4/2003 | Bescherer ..................... 119/52.1 |
| 6,997,649 | B1 | * | 2/2006 | Saito ............................. 405/271 |
| 7,207,516 | B2 | * | 4/2007 | Sheelar ......................... 242/406 |
| 7,841,129 | B2 | * | 11/2010 | Blackshear, Jr. ............. 43/44.99 |
| 8,091,296 | B2 | * | 1/2012 | Horn ............................... 52/198 |
| 2009/0261215 | A1 | * | 10/2009 | Lambert ..................... 248/125.8 |

FOREIGN PATENT DOCUMENTS

| | | | |
|---|---|---|---|
| JP | 04160314 A | * | 6/1992 |
| JP | 11350442 A | * | 12/1999 |
| JP | 3225485 | | 8/2001 |

\* cited by examiner

*Primary Examiner* — R. A. Smith
(74) *Attorney, Agent, or Firm* — Cozen O'Connor

(57) ABSTRACT

An underwater foundation leveling device is capable of preventing a slack wire connected to a support element with a plumb weight from colliding with reflectors. The reflectors 5 are provided for measurement of a position of a leveling area, around an upper portion of the support element 2 supporting the plumb weight for leveling riprap surface of underwater foundation. The support element is hoisted with the wire 4 and then made fall by its own weight for leveling for the foundation surface. The reflectors reflect light toward a light receiving unit for a position detection for the leveling area. The device comprises, a protective element 8 preventing the slack wire 4 from hitting the reflectors, and a light passage located in a position allowing an optical path of the light reflected from the reflectors to travel toward the light receiving unit.

5 Claims, 7 Drawing Sheets

UNDERWATER FOUNDATION LEVELING DEVICE

BACKGROUND OF THE INVENTION

1. Field of the Invention

This invention relates to an underwater foundation leveling device equipped with a plumb weight for leveling an underwater foundation and a unit that detects a position of a foundation area to which leveling is performed (hereinafter referred to as "leveling area").

2. Description of the Related Art

An underwater foundation leveling device has been known, which drops a plumb weight 1 suspended from a crane onto a riprap in water to form a foundation footing in water. FIG. 6 shows an example of such an underwater foundation leveling device which includes a wire lock unit 3 which is secured to the upper end of a pipe-shaped support element 2 to the lower end of which a plumb weight 1 is secured. A wire rope (or chain) 4 secured to the lock unit 3 is coupled to a shipboard crane C and is wound and unwound to lift up and down the plumb weight 1. The foundation is leveled by act of the impact force generated by the fall of the plumb weight 1.

A position of a leveling area is detected in a process for leveling the bottom of a body of water so that a foundation with a target size and a target height is formed by falls of the plumb weight 1.

The use of a position measurement device for the positional detection of a leveling area is known from, for example, Japanese Patent 3225485. A position measurement device 7 comprises a plurality of reflectors 5 which are mounted along and on the outer periphery of an upper portion of the support element 2, a light receiving unit 6 which emitting a light beam a to the reflectors 5 and receives the reflected light a', and a function of calculating a height and two-dimensional position coordinates of the reflectors 5 on the basis of the reflected light a' received thereby.

If the position measurement device 7 determines the position of the reflectors 5 on the basis of the reflected light a', the position of the plumb weight 1 can be determined by calculation based on the length of the support element 2. As a result, the position of the plumb weight on the bottom of a body of water is determined as a position of a leveling area on which the leveling work is being performed.

As described above, a plurality of reflectors 5 are disposed circumferentially on the outer periphery of the upper portion of the support element 2 in order to measure a position of a leveling area.

On the other hand, for allowing the plumb weight 1 to freely fall, the wire 4 coupled to the lock unit 3 is freely unwound from a reel (not shown) such that a smooth fall of the plumb weight 1 is not inhibited.

For this reason, when the plumb weight 1 hits the leveling area and stops, an extra-length portion of the wire 4 may be unwound through the inertia of the reel in some cases. If an extra-length portion of the wire 4 is unwounded in this manner, slack will occur in the wire 4.

Alternatively, the plumb weight 1 may possibly bound upon hit against the leveling area. In this event, slack will also occur in the wire 4.

It is close to impossible to eliminate such slack. As the amount of slack increases, the hanging wire 4 may possibly collide with the reflectors 5 as shown in FIG. 7. Since the wire 4 is used to hoist the support element 2 with the plumb weight 1, a high strength is required, so that a thick and robust wire is formed.

If such a wire 4 collides with the surface of the reflector 5, the reflector 5 could be damaged or the surface of the reflector 5 could be made dirty. If the reflector 5 is damaged or made dirty, it gives rise to disadvantages such as the reflector 5 is incapable of reflecting light, the direction of the reflected light is changed, or the amount of reflected light is decreased, resulting in incapability of correct position measurement.

it is an object of the present invention to provide an underwater foundation leveling device capable of inhibiting a collision of a wire with a reflector even when slack occurs in the wire locked to a support element to which a plumb weight is mounted.

In a first aspect of the present invention, an underwater foundation leveling device includes a support element mounted with a plumb weight used for leveling of a surface of riprap forming a foundation in water, and a plurality of reflectors provided around an upper portion of the support element for measurement of a position of a leveling area. The support element is hoisted with a wire and then made to fall by its own weight for leveling for the surface of the foundation. The reflectors reflect light back toward a light receiving unit for a detection of the position of the leveling area. The underwater foundation leveling device thus structured includes a protective element that prevent the wire in which slack occurs from hitting the reflectors, and a light passage located in a position allowing an optical path of the light reflected from the reflectors to travel toward the light receiving unit.

In a second aspect of the present invention, the protective element is provided above the reflectors, and the light passage is provided under the protective element. In addition, the protective element has an outer edge extending outward beyond a circle formed by the plurality of the reflectors continuously arranged adjacent to each other, and the outer edge is maintained in a relational position where, when the slack wire hits the outer edge, the wire does not collide with the reflectors.

In a third aspect of the present invention, based on the first aspect, the protective element is preferably formed in a dome shape.

In a fourth aspect of the present invention, based on the second aspect, the protective element may is preferably formed in a dome shape.

In a fifth aspect of the present invention, based on the first aspect, the protective element includes a pair of protective members respectively placed on upper and lower sides of the reflectors, and the light passage is provided between the pair of protective members. In addition, each of the protective members has an outer edge extending outward beyond a circle formed by the plurality of the reflectors continuously arranged adjacent to each other. The outer edge is maintained in a relational position where, when the slack wire hits the outer edge, the wire does not collide with the reflectors.

In a sixth aspect of the present invention, based on the first aspect, the protective element surrounds all the reflectors and the light passage is provided in the protective element.

ADVANTAGE EFFECTS OF THE INVENTION

According to the first to the sixth aspect of the present invention, even if a slack occurs in the wire when the plumb weight falls, the slack wire does not collide with the reflectors. Therefore, the wire does not damage the reflectors and not make the surfaces of the reflectors dirty. In consequence, it is possible to perform a correct position measurement on the leveling area at all times.

According to the second aspect, the structure of the protective element can be simplified and also the optical path of the reflected light can be satisfactory ensured.

According, to the third and the fourth aspect, the dome shape of the protective element itself protects the protective element from an impact force by the wire, resulting in an improvement in endurance of the protective element.

According to the fifth aspect, it is possible to protect the reflectors even if an extreme large amount of slack occurring in the wire and the wire greatly hangs down.

According to the sixth aspect, more reliable protection of the reflectors can be achieved irrespective of the amount of slack in the wire.

DETAILED DESCRIPTION OF THE INVENTION

Figure 1:
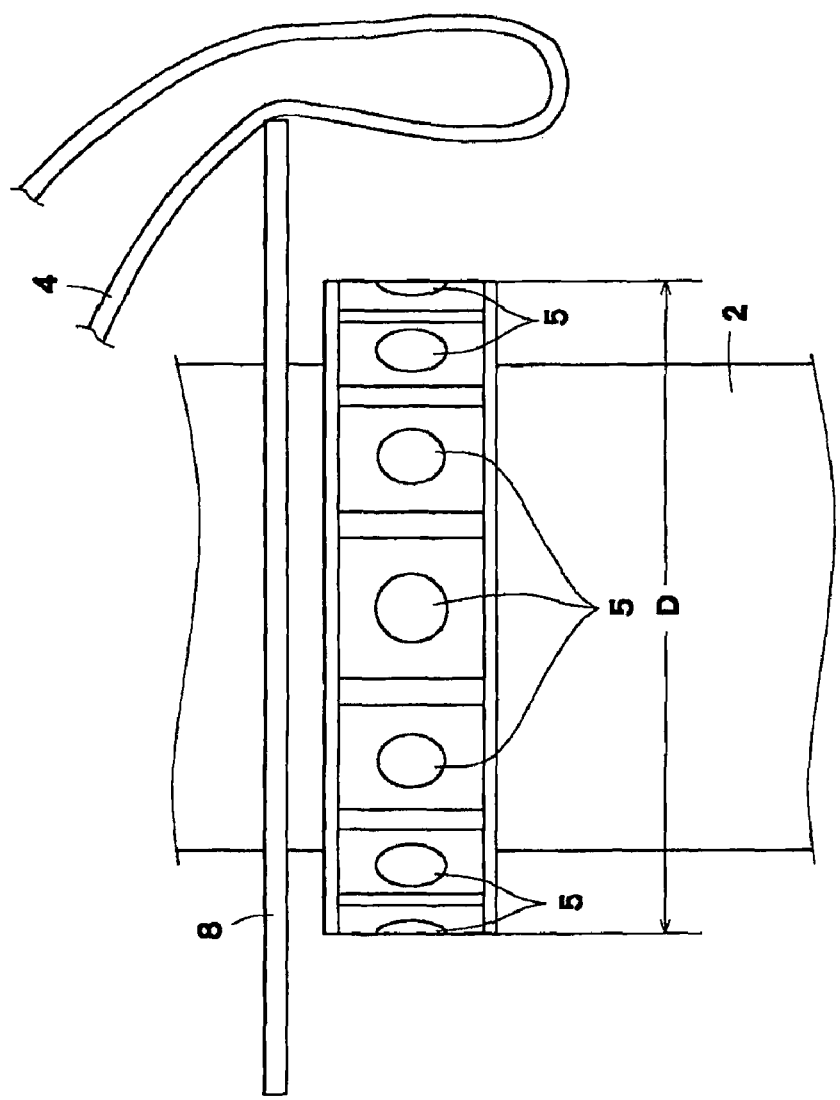
FIG. 1 is a front view of essential components according to a first embodiment.
Figure 6:
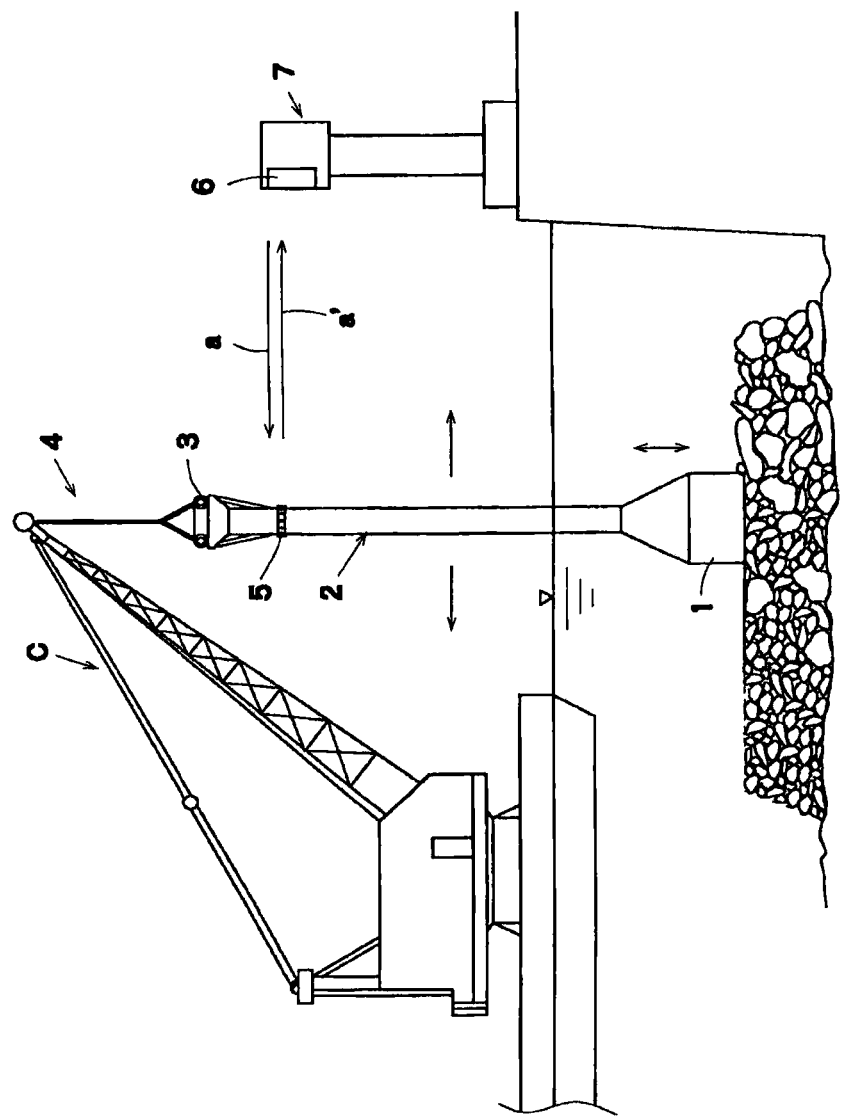
FIG. 6 is a schematic diagram illustrating an example of use of a related-art underwater foundation leveling device.
Figure 7:
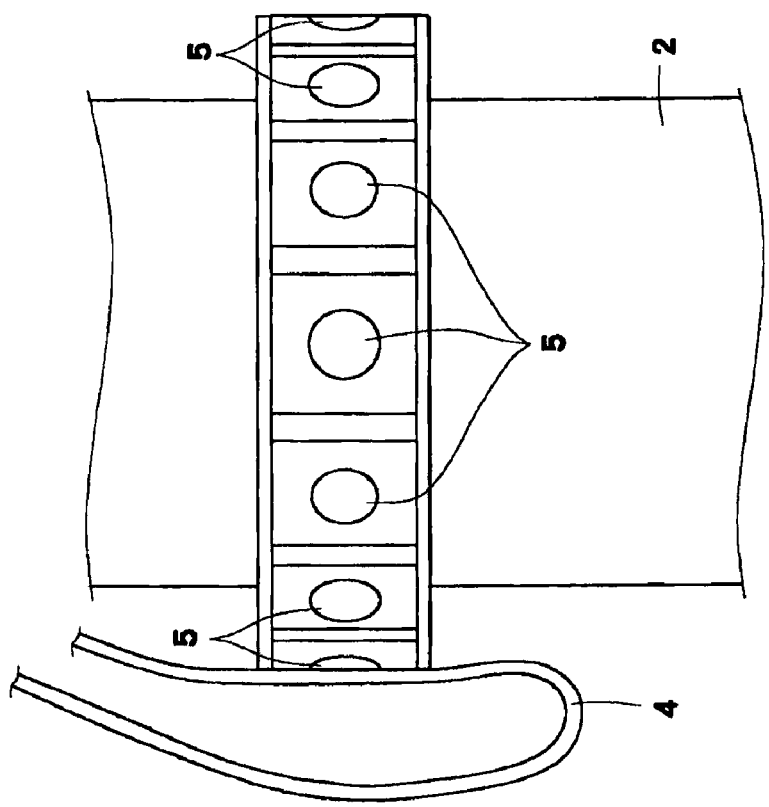
FIG. 7 is a front view of essential components in an example of related art.

FIG. 1 illustrates a first embodiment according to the present invention, in which a protective element 8 is mounted above reflectors 5 which are mounted around a support element 2 having a plumb weight 1 attached thereto. Except that the protective element 8 is provided, the underwater foundation leveling device according to the first embodiment is similar in structure and usage to related art one illustrated in FIG. 6.

The protective element 8 is formed of a metal-made circular-plate-shaped member, and securely welded to the support element 2.

The circular-plate-shaped member forming the protective element 8 has a diameter larger than the diameter D of a circle formed by a plurality of reflectors 5 which are placed continuously adjacent to each other, in order to protect the reflectors 5 from collision with a slack wire 4 as shown in FIG. 1 even when the slack wire 4 collides with the outer edge of the protective element 8.

Specifically, the protective element 8 has an outer edge extending outward beyond the circle formed by the continuous arrangement of the plurality of reflectors 5. The outer edge of the protective element 8 is maintained in a relational position where, when the slack wire collides with the outer edge, the wire does not collide with the reflector 5.

For this reason, in the process of leveling the bottom of a body of water by use of the plumb weight 1, even if slack occurs in the wire 4, the slack wire 4 does not collide with the reflector 5, thereby damaging the reflector 5 or making the surface of the reflector 5 dirty.

In addition, the protective element 8 is provided above the reflectors 5, so that an area immediately below the protective element is fully bare without any coverage to form a light passage of the present invention.

Thus, the protective element 8 does not block an optical path of the light reflected from the reflectors 5 in the position measuring process.

As a result, in the underwater foundation leveling device according to the first embodiment, a position measurement can be correctly carried out at any times, because the reflectors 5 are not damaged and not made dirty by a slack wire 4.

As in the case of the protective element 8, if a protective element is formed of a plate-shaped member, the structure of the protective element can be advantageously simplified and also a light passage can be easily provided in a size sufficient to pass light.

The protective element 8 is formed of a circular-plate-shaped member in the first embodiment, but the protective element is not limited to a circular plate shape. As long as a protective element has an outer edge extending outward beyond the circumference of the circle created by the continuous arrangement of the plurality of the reflectors 5, the protective element can be formed in any shape, and, for example, it may have a polygonal outer edge.

When a slack wire 4 hits the outer edge of the protective element 8, a relational position where the slack wire 4 does not collide with the reflectors 5 is varied depending on the amount of slack occurring in the wire 4, a vertical position of the protective element 8, a protruding position of the outer edge of the protective element 8, that is, the diameter of the protective element 8, and the like. Hence, the relational position can be achieved by adjusting other elements based on a predicted amount of slack occurring in the wire 4 during the leveling work performed by use of the underwater foundation leveling device.

Figure 2:
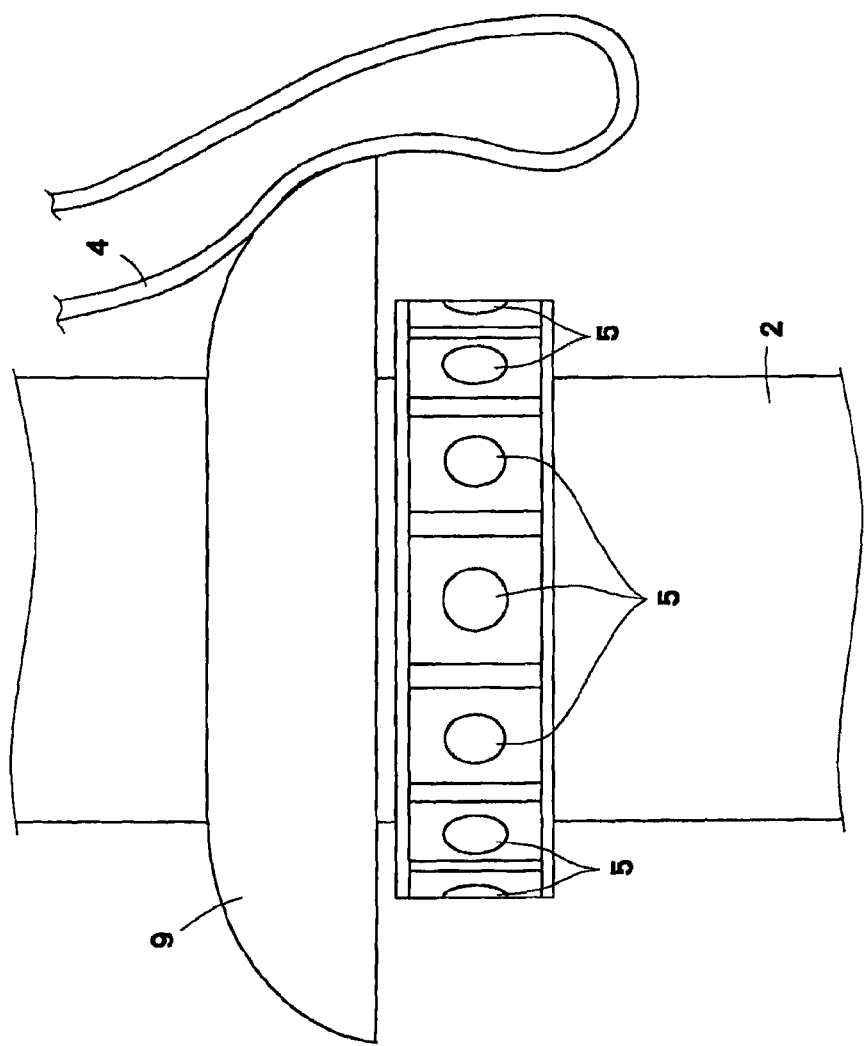
FIG. 2 is a front view of essential components according to a second embodiment.

FIG. 2 illustrates a second embodiment, in which the underwater foundation leveling device comprises a dome-shaped protective element 9. The second embodiment is different in this respect from the first embodiment, but the structure of other components is the same as that in the first embodiment.

In the second embodiment, a dome-shaped protective element 9 is fixedly mounted on a portion of the outer periphery of the support element 2 above the reflectors 5. The outer edge of the protective element 9 extends outward beyond the circle formed by continuous arrangement of the reflectors 5.

The bottom side of the protective element 9 a part of which forms the outer edge of the same is situated above the reflectors 5, so that a light passage is formed under the protective element 9.

With a structure as described above, the protective element 9 does not block the optical path of reflected light when the position of the leveling area is measured. As illustrated in FIG. 2, even if the slack wire 4 hangs down and collides with the protective element 9, the wire 4 does not collides with the reflectors 5. As a result, the reflectors 5 are neither damaged nor made dirty by impact of the collision of the wire 4.

In addition, the dome-shaped protective element 9 increases impact resistance, thus preventing the protective element 9 from being deformed or broken by impact of the collision of the wire 4.

In the dome-shaped protective element 9, the hanging-down portion of the wire 4 collides with an inclined portion of the protective element 9, resulting in a reduction in the force of the wire 4 acting in the direction toward the reflectors 5. For this reason, even if a large amount of slack beyond expectation occurs in the wire 4 and the slack wire 4 collides with the reflectors 5 under the protective element 9, the impact force can be reduced to protect the reflectors 5 from fracture.

Figure 3:
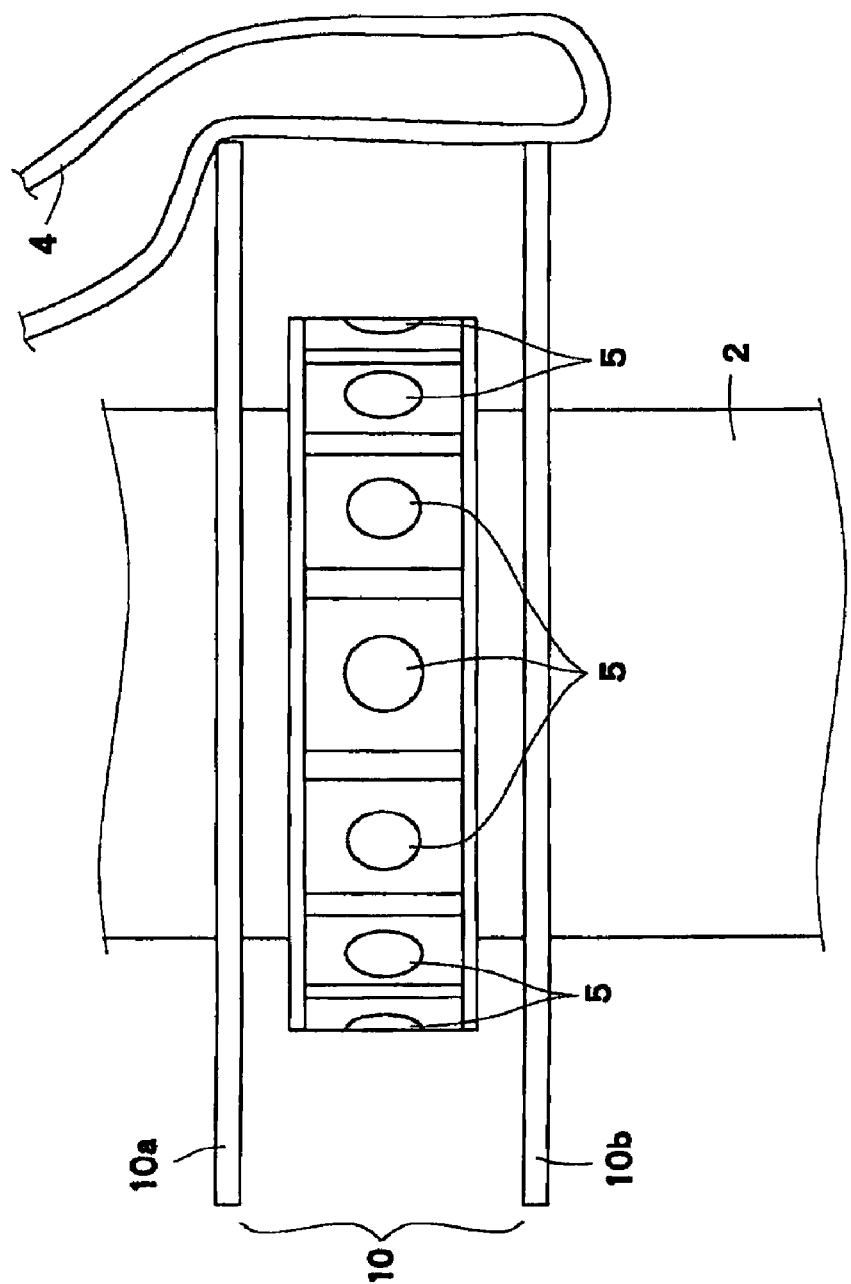
FIG. 3 is a front view of essential components according to a third embodiment.

FIG. 3 illustrates a third embodiment, in which a pair of plate-shaped protective members 10a, 10b are disposed respectively on the upper side and the lower side of the plurality of reflectors 5 and form a protective element 10. Except the structure of the protective element 10, the underwater foundation leveling device in the third embodiment is similar to that in the first embodiment.

In the protective element 10, a light passage is formed between the protective members 10a, 10b. The outer edges of the respective protective members 10a, 10b extend outward beyond the circle which is formed by continuous arrangement of the reflectors 5.

Since the protective element 10 is structured as described above, when the slack wire 4 hangs down, the wire 4 collides with the outer edges of the respective protective members 10a, 10b, thus inhibiting the wire 4 from coming into collision with the reflectors 5. In particular, when a large amount of slack occurs in the wire 4, the slack wire 4 collides with the protective member 10b which is disposed on the lower side of the reflective element 5, whereby the wire 4 is inhibited from breaking or making the reflectors 5 dirty.

As a result, in the underwater foundation leveling device according to the third embodiment, the reflector 5 may not possibly be damaged. It follows that an accurate position measurement can be achieved.

The third embodiment employs the pair of plate-shaped protective members 10a, 10b, but the protective members 10a, 10b are not limited to a plate shape. For example, the protective members 10a, 10b may be formed in a dome shape. In particular, if the upper protective member 10a is formed in a dome shape, the impact of the wire 4 can be reduced on the inclined surface of the dome and also the impact resistance of the protective member 10a can be increased, as is the case with the second embodiment.

Figure 4:
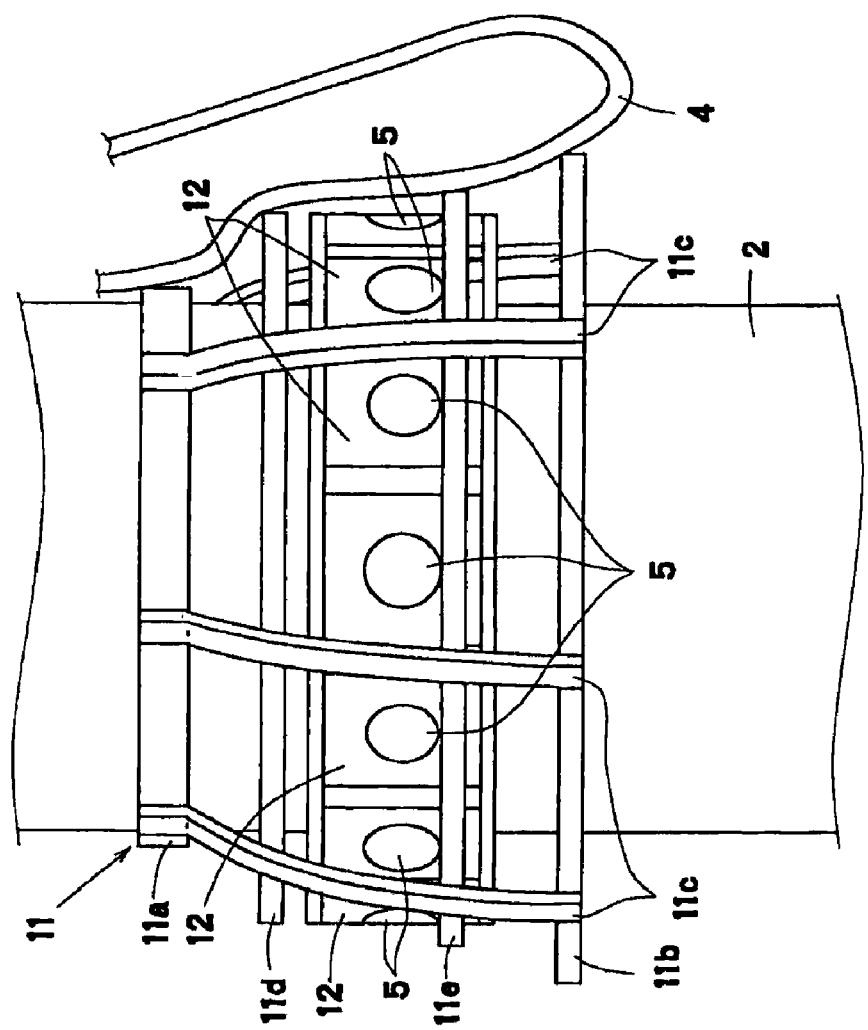
FIG. 4 is a front view of essential components according to a fourth embodiment.

FIG. 4 illustrates a fourth embodiment, in which a metal-made protective element 11 of a cage form is mounted on the support element 2 to entirely cover a plurality of reflectors 5. The structure of the other components in the fourth embodiment is the same as that in the first embodiment.

The protective element 11 according to the fourth embodiment comprises a ring member 11a which is secured to a portion of the outer periphery of the support element 2 above the reflectors 5, a ring member 11b which is horizontally placed below the ring member 11a and has a larger diameter than that of the ring member 11a, and a plurality of linear members 11c which vertically extend between the lower and upper ring members 11a, 11b such that the ring members 11a, 11b are coupled to each other through the linear members 11c. In addition, additional ring members 11d, 11e are placed between the ring members 11a, 11b and secured to the linear members 11c to form a cage—shaped protective element 11.

The reflectors 5 are assigned to regions between the ring members 11d, 11e and the linear members 11c such that the regions serve as light passages 12. Hence, the protective element 11 does not block the optical path of the light reflected from the reflectors 5.

The diameter of the ring members 11d, 11e is set to be greater than the diameter of the circle formed by the continuous arrangement of the plurality of the reflectors 5 such that both the ring members 11d, 11e are situated outside of this circle.

For this reason, in the fourth embodiment, the slack wire 4 collides with the protective element 11 as shown in FIG. 4, but does not collide with the reflectors 5. It follows that the wire 4 does not becomes a cause of either fracture nor dirtying of the reflectors 5.

In particular, since the protective element 11 according to the fourth embodiment entirely covers the plurality of the reflectors 5, the protective element 11 is capable of coping with any amount of slack in the wire 4, resulting in prevention of collision of the wire 4 with the reflectors 5 with more reliability.

Note that each of the ring members 11a, 11b, 11d and 11e can be divided into two along its diameter, and the divided parts may have one ends rotatably coupled to each other through a hinge and the other ends provided with an openable connecting member. By doing so, the protective element 11 can be detachable mounted to the support element 2.

The first to fourth embodiment have described the underwater foundation leveling device comprising the pipe-shaped support element 2, but a protective element according to the present invention can be employed in any under foundation leveling device, irrespective of a structure of a support element, a shape of a plumb weight and the like, as long as it uses a plumb weight to level the surface of riprap and includes reflectors for measuring a position of the leveling area.

Figure 5:
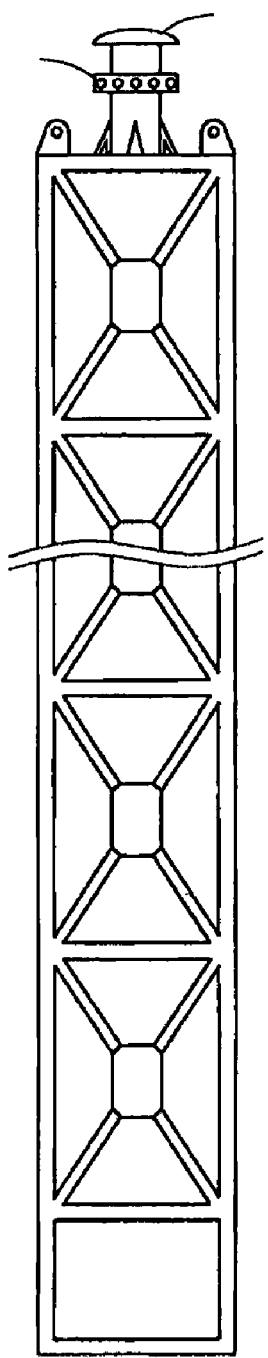
FIG. 5 is a front view according to a fifth embodiment.

For example, a fifth embodiment illustrated in FIG. 5 describes the case of the plumb weight 1 is supported by a support element 13 of a frame form. The plurality of reflectors 5 is mounted on the outer periphery above the support element 13, and then a protective element 9 as is the case with the second embodiment shown in FIG. 2 is provided above the reflectors 5.

As in the case of the second embodiment, according to the fifth embodiment, when the slack wire 4 collides with the protective element 9, the wire 4 does not collides with the reflectors 5, thus protecting the reflectors 5 from damage and dirt.

What is claimed is:

1. An underwater foundation leveling device, including a support element mounted with a plumb weight used for leveling of a surface of riprap forming a foundation in water, and a plurality of reflectors provided around an upper portion of the support element for measurement of a position of a leveling area, the support element being hoisted with a wire and then being made to fall by its own weight for leveling for the surface of the foundation, the reflectors reflecting light back toward a light receiving unit for a detection of the position of the leveling area, the underwater foundation leveling device comprising, a protective element that prevents the wire in which slack occurs from hitting the reflectors, and a light passage located in a position allowing an optical path of the light reflected from the reflectors to travel toward the light receiving unit and wherein the protective element includes a pair of protective members respectively placed on upper and lower sides of the reflectors, the light passage is provided between the pair of protective members, each of the protective members has an outer edge extending outward beyond a circle formed by the plurality of the reflectors continuously arranged adjacent to each other, and the outer edge is maintained in a relational position where, when the slack wire hits the outer edge, the wire does not collide with the reflectors.

2. An underwater foundation leveling device, including a support element mounted with a plumb weight used for leveling of a surface of riprap forming a foundation in water, and a plurality of reflectors provided around an upper portion of the support element for measurement of a position of a leveling area, the support element being hoisted with a wire and then being made to fall by its own weight for leveling for the surface of the foundation, the reflectors reflecting light back toward a light receiving unit for a detection of the position of the leveling area, the underwater foundation leveling device comprising, a protective element that prevents the wire in which slack occurs from hitting the reflectors, and a light passage located in a position allowing an optical path of the light reflected from the reflectors to travel toward the light receiving unit and wherein the protective element surrounds all the reflectors and the light passage is provided in the protective element.

3. An underwater foundation leveling device, including a support element mounted with a plumb weight used for leveling of a surface of riprap forming a foundation in water, and a plurality of reflectors provided around an upper portion of the support element for measurement of a position of a leveling area, the support element being hoisted with a wire and then being made to fall by its own weight for leveling for the surface of the foundation, the reflectors reflecting light back toward a light receiving unit for a detection of the position of the leveling area, the underwater foundation leveling device comprising, a protective element that prevents the wire in which slack occurs from hitting the reflectors, and a light passage located in a position allowing an optical path of the light reflected from the reflectors to travel toward the light receiving unit, wherein the protective element is provided above the reflectors;

the light passage is located below the protective element;

the protective element has an outer edge located outside of a circle formed by a line connecting the plurality of reflectors mounted on the support element; and the outer edge of the protective element and the reflectors maintain a positional relationship with each other in which, when a slack wire hits the outer edge, the wire does not collide with the reflectors.

4. The underwater foundation leveling device according to claim 3, wherein the protective element is formed in a dome shape.

5. The underwater foundation leveling device according to claim 3 wherein the protective element is plate-shaped.

* * * * *